Patented Dec. 20, 1932

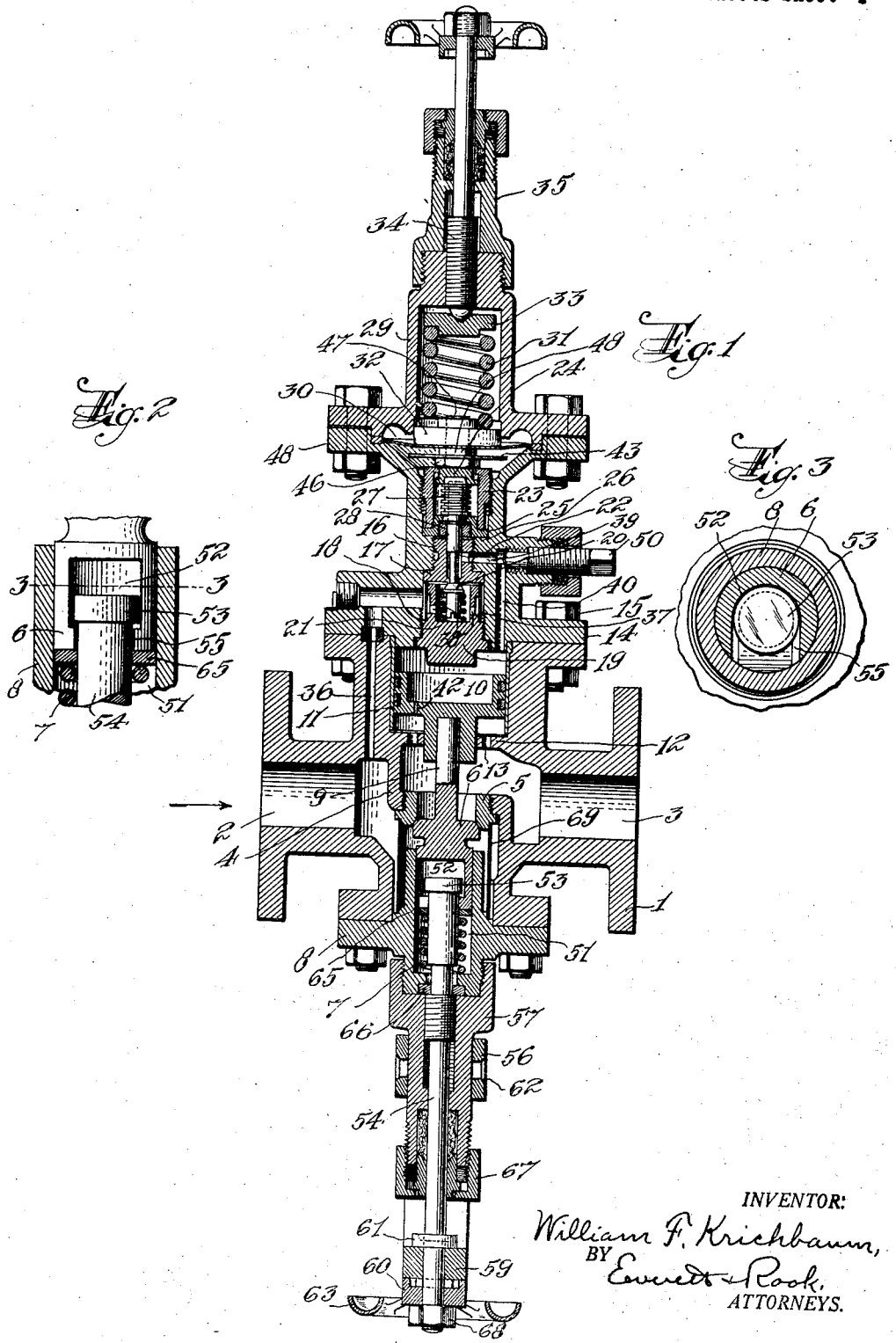

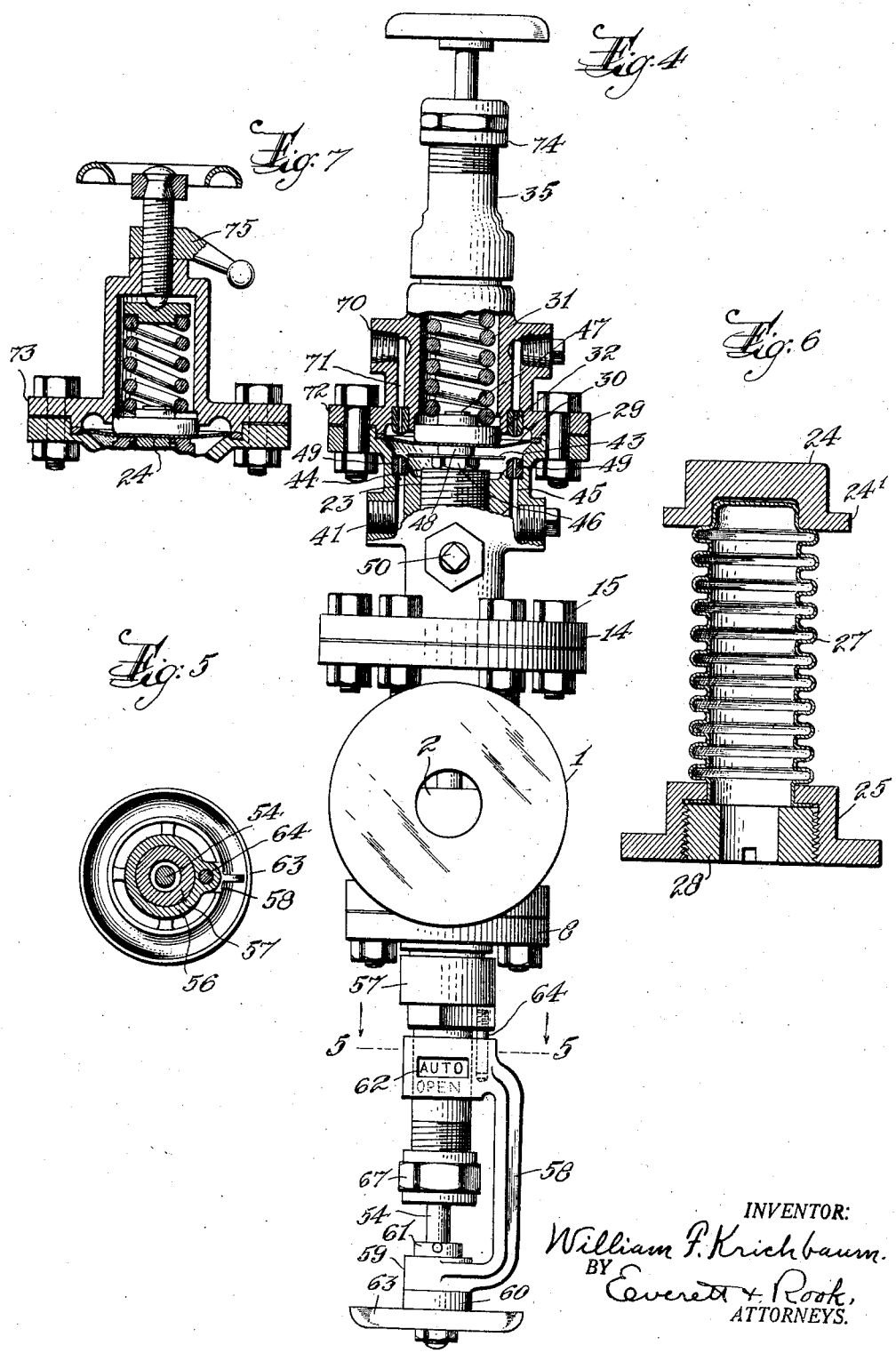

1,891,547

UNITED STATES PATENT OFFICE

WILLIAM F. KRICHBAUM, OF MILLBURN, NEW JERSEY

AUXILIARY OPERATED GOVERNING VALVE

Application filed July 2, 1930. Serial No. 465,270.

The objects of this invention are to secure in an auxiliary operated pump governor or the like an effective sealing against any mixture of two fluids, such for example, as steam and water, oil or air, when the valve is installed on pumps, compressors, etc.; to accomplish this without the use of stuffing boxes or additional diaphragms in the valve or otherwise materially altering the appearance or general structure of the valve; to secure such sealing by means of a bellows between the auxiliary valve stem and the diaphragm by which the discharge pressure is controlled, and to secure other advantages and results.

Another object is to provide in auxiliary operated pump governors and the like means by which the main valve can at any time be opened wider, by hand, to meet an emergency, without changing the spring adjustment controlling the discharge pressure, and yet be returned at will to automatic operation; to enable this to be done without closing the valve or enabling it to be closed other than automatically; to provide means for indicating whether or not the main valve is in position to operate automatically or is held open, and to secure other advantages and results.

Other objects of the invention and other advantages and results secured thereby may be brought out in the following description.

Referring to the accompanying drawings, in which like characters of reference indicate the same parts throughout the several views, Figure 1 is a central section of my improved governing valve, taken through the main inlet and outlet ports;

Figure 2 is a side elevation of the lower portion of the main valve, looking from the left-hand side of Figure 1;

Figure 3 is a cross-section on line 3—3, Fig. 2;

Figure 4 is a side elevation of my governing valve, partly in section, looking from the right-hand side of Figure 1;

Figure 5 is a cross-section on line 5—5, Fig. 4;

Figure 6 shows a portion of Figure 1 on larger scale to illustrate a certain bellows more clearly, and Figure 7 shows in section like Fig. 4, a spring cap of simplified construction for certain uses of the valve.

In the specific embodiment of the invention shown in said drawings, 1 indicates the main body portion of the governor, provided with an inlet 2 and an outlet 3, and having between said inlet and outlet a partition 4 provided with a seat ring 5 for a main valve 6, said main valve being normally closed upward by a spring 7 seated in a lower cap 8 for the body portion 1. Said main valve 6 has a stem 9 extending upward through the seat ring 5 and upon which stem is a piston 10 working in a cylinder 11 formed in the upper part of the body portion 1, said stem being guided in a partition 12 perforated as at 13 to provide communication with the outlet side of the main valve. Any other pressure responsive means which is common and well-known in the art can be employed instead of a piston, for moving the main valve, the piston being shown and described merely as an illustrative pressure responsive means.

Upon the said body portion 1 of the governor is mounted an auxiliary valve portion 14 adapted to be bolted to the body portion as by bolts 15. This auxiliary valve portion 14 is longitudinally open and an intermediate portion 16 of this opening is threaded to receive through the bottom an auxiliary valve seat member 17, a lower enlarged portion 18 of said opening having its walls threaded to receive a bottom plug 19. The inner end of this plug 19 is chambered to receive the auxiliary valve 20 which is normally held by a spring 21 against its seat in the member 17 and has a stem 22 extending through said seat 17 and therebeyond. The upper part of the passage of the auxiliary valve portion 14 is threaded to receive a top plug 23 which is recessed from its inner end to slidably receive a bellows head 24 which moves up and down with the auxiliary valve stem 22 and may project from said top plug 23 as shown, further outward movement being limited by a flange 24' on the head 24. A bellows support 25 is imperviously clamped between the inner end of said top plug 23 and an opposed seat 26 in the wall of the said longitudinal opening of the auxiliary valve portion 14, and within the recess of the top plug extending between the said support 25 and the bellows head 24 is a cup-shaped metal bellows 27 enclosing the upper end part of the auxiliary valve stem 22. This bellows is closed at its top and abuts the head 24, while its lower edge is flared and imperviously clamped to the support 25 by a screw ring 28, see Figure 6.

A spring bonnet 29 is bolted upon the top of the auxiliary valve portion 14 and clamps thereagainst the edges of a diaphragm 30 as well as forming with said auxiliary valve portion a diaphragm chamber, said diaphragm being adapted to transmit pressure to the auxiliary valve stem 22 from an adjusting spring 31 in the bonnet having a lower washer 32 to engage said diaphragm and an upper washer 33 engaged by a hand screw 34 working in the top of the bonnet and having a stuffing box 35. By this hand screw the pressure of the spring 31 upon the diaphragm 30 may be adjusted as desired.

The parts being shown in positions which they assume when the governor is disconnected and not in use, it will be understood that after the governor is connected up in a pipe line to supply one pressure fluid in a certain relation to another, as steam to an air compressor so as to maintain a certain pressure in the tank of the air compressor, according as the spring 31 may be set, the inlet pressure will pass upward through a duct 36 and so to the auxiliary valve 20 through the screen 37 and ports 38. Beyond the auxiliary valve the initial pressure passes through ducts 39 and 40 to the upper part of the piston chamber 11 and building up there moves the piston 10 downward against its spring 7 to open the main valve 6 and allow direct flow of pressure through the main valve from its inlet 2 to its outlet 3. When the desired delivery pressure for which the governor is set by its spring 31, already described, is reached, that delivery pressure entering through the duct 41, see Figure 4, counteracts the pressure of the spring 31 on the diaphragm 30 and forces the same upward, allowing the tension on auxiliary valve spring 21 to close the auxiliary valve. The pressure above and below the piston 10 is then equalized by the port 42 in said piston and the main valve 6 is closed by its spring 7 aided by the initial pressure at the inlet side of the main valve. In actual operation the auxiliary valve is opened or closed by the slightest variation of the reduced pressure, permitting sufficient supply pressure to enter and operate the piston 10 and main valve 6, the latter assuming a balanced position to maintain the desired delivery pressure.

It will be seen that the delivery pressure fluid entering beneath the diaphragm 30, in the operation of my improved valve, cannot mix with the inlet pressure fluid passing the auxiliary valve, because even if the latter passes along the stem 22 of the auxiliary valve it is stopped by the bellows 27 enclosing the end of the auxiliary valve stem and which is imperviously clamped in the bellows support 25, and said bellows support is in turn imperviously seated at 26 in the auxiliary valve portion 14 of the governor casing. Thus by very simple and effective means, which do not require objectionable changes in the general construction of the governor, I have provided an effective sealing against any mixture of the two pressure fluids. Another important advantage of this construction is that the bonnet 29 may be removed for inspection or repair of the diaphragm 30 or spring 31 without danger of injury to the bellows 27 and without in any way disturbing the bellows or its associated parts 23, 24; when the bonnet 29 is removed extension of the bellows under internal pressure is limited by engagement of the stop flange 24' on the bellows head 24 with the shoulder on the top plug 23.

A further feature of my invention is the introduction of a needle valve 50 in the side of the auxiliary valve portion 14 of the governor casing to imperviously close the duct 40, so that by closing this needle valve at any time while the governor is in use the diaphragm, bellows and their associated parts can be removed for repairs without changing the spring adjustment or stopping flow passing through the valve body.

It sometimes occurs in a governor that certain and violent changes in discharge pressure cause what is called hunting or surging of the discharge fluid pressure against the controlling diaphragm 30, and I have found that this can be eliminated to a large extent by retarding the discharge of such control pressure from the diaphragm chamber beneath the diaphragm 30. Various means may be employed for doing this, but I have shown a baffle plate 43 beneath the diaphragm at a distance therefrom and extending outward to the ducts 44, 45, Figure 4. This baffle plate is shown carried by a bolt having its head 46 beneath the baffle plate and adapted to engage the bellows head 24, the shank 47 of the bolt extending through a spacing collar 48 and the diaphragm 30 to screw into the lower spring washer 32 and thus clamp all said parts in position. If desired nipples 49 may be inserted in the discharge ends of the ducts 44 and 45, either in addition to the baffle plates 43 or without the same, to retard the flow of discharge pressure from the diaphragm 30.

Another feature of my invention is the provision of means by which the main valve 6 can be at any time opened wider by hand without changing the spring adjustment and returned at will to automatic operation, and this is done in the following way. The lower part of the main valve 6 works in a slideway 51 formed in the cap 8 and is laterally recessed near its lower end as at 52 to receive the head 53 of a screw stem 54, the floor of said recess having a radial slot 55 of less width than the recess and adapted to receive the shank of the screw stem 54. The screw stem can thus be connected to the valve stem before the same is inserted in the cap 8, and when the parts are assembled retraction of the screw stem will draw the main valve 6 open against the spring 7 without disturbing the rest of the governing valve; when the screw stem is screwed inward as far as possible, however, there is enough play of the head 53 in the recess 52 to permit the main valve to operate automatically. In order to clearly indicate whether the main valve is in a position to operate automatically or is drawn open by the screw stem 54, a sleeve-like indicator 56 is arranged to slide upon an extension 57 screwed onto the outer end of the cap 8 and connected by a yoke 58 to a ring 59 upon a screw stem near its outer or lower end and held against longitudinal movement thereon by means of washers 60 and 61 pinned to said screw stem against longitudinal movement thereon. This sleeve 56 has a sight opening 62 in its side wall adapted to cover and uncover indicia such as "Auto" and "Open", indicating that the valve is in position to operate automatically or that it is held wide open, according to whether the screw stem is screwed out at its outer end or is screwed in, as by means of a hand wheel 63. To prevent the yoke from turning, a pin 64 depends parallel to the screw stem into a socket for said pin in the sleeve 56.

A washer 65 upon the screw stem beneath the laterally recessed portion of the main valve 6 affords a seat for the spring 7, and a split washer 66 between the cap 8 and its extension 57 enables sufficient movement of the screw stem 54 to disconnect it from the main valve 6. A stuffing box 67 is provided for the screw stem 54 at the outer end of the cap extension 57, and a nut 68 at the outer end of said screw stem holds the handwheel 63 and yoke 58 upon the stem. Reference numeral 69 indicates a screen for the main valve 6 as shown and described in my prior Patent No. 1,615,285 of January 25, 1927, which shows the type of valve to which the present improvements relate.

When my improved governing valve is used as a boiler feed governor the boiler pressure is connected to one of the bosses 70 on the spring bonnet 29, the other boss being closed, and such pressure passes through a duct 71 and retarding nipple 72 to the upper side of the controlling diaphragm 30, and the differential of pressure necessary between said boiler pressure and the discharge pressure below the diaphragm is supplied by the adjusting spring 31. In other uses of my improved valve the inlets at both bosses 70 can be closed by plugs, or a spring cap 73 such as shown in Figure 7 can be used, having no bosses or passages. This cap 73 eliminates the necessity of the stuffing box 74, Figure 2, and a simple lock nut 75 may be employed as shown in Figure 7.

Various detail modifications may be made by those skilled in the art in carrying out my invention, without departing from the spirit and scope thereof, and therefore I do not desire to be understood as limiting myself except as required by the following claims when construed in the light of the prior art.

Having thus described the invention, what I claim is:

1. An auxiliary governing valve including a casing having a main valve, pressure responsive means for moving said main valve, means for conducting intake pressure to said pressure responsive means including an auxiliary valve having a stem one end of which projects through an opening in said casing into a chamber, a yielding control member in said chamber for exerting pressure upon said end of the stem, means for conducting discharge pressure to said chamber at one side of said yielding control member, means for exerting pressure on the other side of said yielding control member, a bellows support imperviously seated in said chamber around said opening, a top plug in said chamber clamping said support imperviously in place and providing an interior slideway with a stop near the control member, a head in said slideway adapted to engage said stop and project therebeyond to abuttingly engage the control member, and a cup-shaped flexible bellows between said stem and said slidable head enclosing said end of the stem and having its edges imperviously connected to said support.

2. An auxiliary operated governing valve including a casing having an inlet and an outlet, a normally closed main valve for controlling communication between said inlet and said outlet, pressure responsive means for automatically operating said main valve, means for conducting inlet pressure to said responsive means including an auxiliary valve, a manually operable stem having a screw threaded connection with said casing, said main valve normally being movable independently of and relatively to said stem to permit said main valve to be automatically operated by said pressure responsive means, said main valve and said stem having cooperating parts to engage upon longitudinal movement of said stem in one direction to pull and hold said main valve from its seat, said cooperating parts being disengaged upon longitudinal movement of the stem in the opposite direction to release said main valve for automatic operation, and means to prevent closing of said main valve by said stem.

WILLIAM F. KRICHBAUM.